United States Patent
Okamoto et al.

(10) Patent No.: US 9,587,658 B2
(45) Date of Patent: Mar. 7, 2017

(54) HYDRAULIC CYLINDER SYSTEM

(75) Inventors: Hirofumi Okamoto, Kyoto (JP);
Masayoshi Okuda, Minato-ku (JP)

(73) Assignee: MITSUBISHI HEAVY INDUSTRIES, LTD, Tokyo (JP)

( * ) Notice: Subject to any disclaimer, the term of this patent is extended or adjusted under 35 U.S.C. 154(b) by 376 days.

(21) Appl. No.: 13/989,481

(22) PCT Filed: Nov. 10, 2011

(86) PCT No.: PCT/JP2011/075904
§ 371 (c)(1),
(2), (4) Date: May 24, 2013

(87) PCT Pub. No.: WO2012/070392
PCT Pub. Date: May 31, 2012

(65) Prior Publication Data
US 2013/0239797 A1    Sep. 19, 2013

(30) Foreign Application Priority Data
Nov. 25, 2010 (JP) .................................. 2010-261915

(51) Int. Cl.
F15B 20/00 (2006.01)
B64C 13/50 (2006.01)
F15B 18/00 (2006.01)

(52) U.S. Cl.
CPC .......... F15B 20/002 (2013.01); B64C 13/503 (2013.01); F15B 18/00 (2013.01);
(Continued)

(58) Field of Classification Search
CPC .................. F15B 20/002; F15B 19/005; F15B 2211/7107; F04B 23/06; B64C 13/42; F04C 15/0061
(Continued)

(56) References Cited

U.S. PATENT DOCUMENTS 3,270,623 A    9/1966    Garnjost et al.
3,401,600 A    9/1968    Wood
(Continued)

FOREIGN PATENT DOCUMENTS

CH    FR 2925624 A1 *    6/2009    .......... F15B 13/0839
DE    94 11 335 U1    11/1995
(Continued)

OTHER PUBLICATIONS

Hanson, Neal. "Selecting Proportional Valves and High Response Valves". [electronic presentation] Presented Apr. 13-14, 2010 as Technical Session: Hydraulic Proportional and Servo Technologies. [retrieved May 15, 2015] retrieved from Internet <URL http://www.cmafh.com/enewsletter/ENews%20editions/DFTthankyou_eNewsletter_2010.html>.*

(Continued)

*Primary Examiner* — F. Daniel Lopez
*Assistant Examiner* — Richard Drake
(74) *Attorney, Agent, or Firm* — Sughrue Mion, PLLC

(57) ABSTRACT

A hydraulic cylinder system 1 is provided with a plurality of cylinders 3a and 3b, valves 4a and 4b provided at each of the cylinders 3a and 3b for adjusting amounts of operating fluid into and out of the cylinders 3a and 3b, driving systems 5a and 5b having motors 6a and 6b provided at each of the valves 4a and 4b for driving the valves 4a and 4b, and a connecting member 8 for connecting the motors 6a and 6b of the driving systems 5a and 5b in a manner capable of interlocking with each other.

5 Claims, 3 Drawing Sheets

(52) U.S. Cl.
CPC .............. *F15B 2211/7107* (2013.01); *F15B 2211/8757* (2013.01)

(58) Field of Classification Search
USPC ................ 60/403; 180/65.28, 65.1
See application file for complete search history.

(56) References Cited

U.S. PATENT DOCUMENTS

| | | | | |
|---|---|---|---|---|
| 5,299,420 | A * | 4/1994 | Devier et al. | 60/403 |
| 6,209,677 | B1 * | 4/2001 | Bohner et al. | 180/406 |
| 6,945,350 | B2 * | 9/2005 | Szabela et al. | 180/411 |
| 6,981,439 | B2 * | 1/2006 | Hart | B64C 13/42 60/403 |
| 7,175,133 | B2 * | 2/2007 | Tanaka et al. | 244/99.4 |
| 7,770,696 | B2 * | 8/2010 | Futahashi | B66F 9/22 187/224 |
| 7,770,697 | B2 * | 8/2010 | Futahashi | B66F 9/22 187/224 |
| 8,232,750 | B2 * | 7/2012 | Smugeresky | H02K 16/00 318/34 |
| 8,620,522 | B2 * | 12/2013 | Matsui | B64C 13/40 701/3 |
| 2006/0226285 | A1 * | 10/2006 | Matsui | 244/99.6 |
| 2007/0213160 | A1 * | 9/2007 | Lyons et al. | 475/5 |
| 2009/0072083 | A1 * | 3/2009 | Hanlon | B64C 13/42 244/87 |
| 2009/0229694 | A1 * | 9/2009 | Fenny | B64C 13/42 137/625.63 |
| 2010/0025131 | A1 * | 2/2010 | Gloceri | B60G 3/20 180/65.28 |
| 2010/0253168 | A1 * | 10/2010 | Herrmann | H02K 16/00 310/114 |

FOREIGN PATENT DOCUMENTS

| | | |
|---|---|---|
| GB | 2 082 799 | 3/1982 |
| JP | 53-76276 A | 7/1978 |
| JP | 4-60203 A | 2/1992 |
| JP | 9-144713 A | 6/1997 |
| JP | 9-328098 A | 12/1997 |
| WO | 91/04169 | 4/1991 |
| WO | 2006/088488 | 8/2006 |

OTHER PUBLICATIONS

Machine Translation of FR 2925624 ("Hydraulic Control Valve System", English machine translation provided by EPO and Google. <retrieved on Apr. 19, 2016><URL: http://worldwide.espacenet.com/>).*
International Search Report for PCT/JP2011/075904 dated Dec. 13, 2011.
Extended European Search Report issued Nov. 23, 2015 in European Patent Application No. 11842572.7.

* cited by examiner

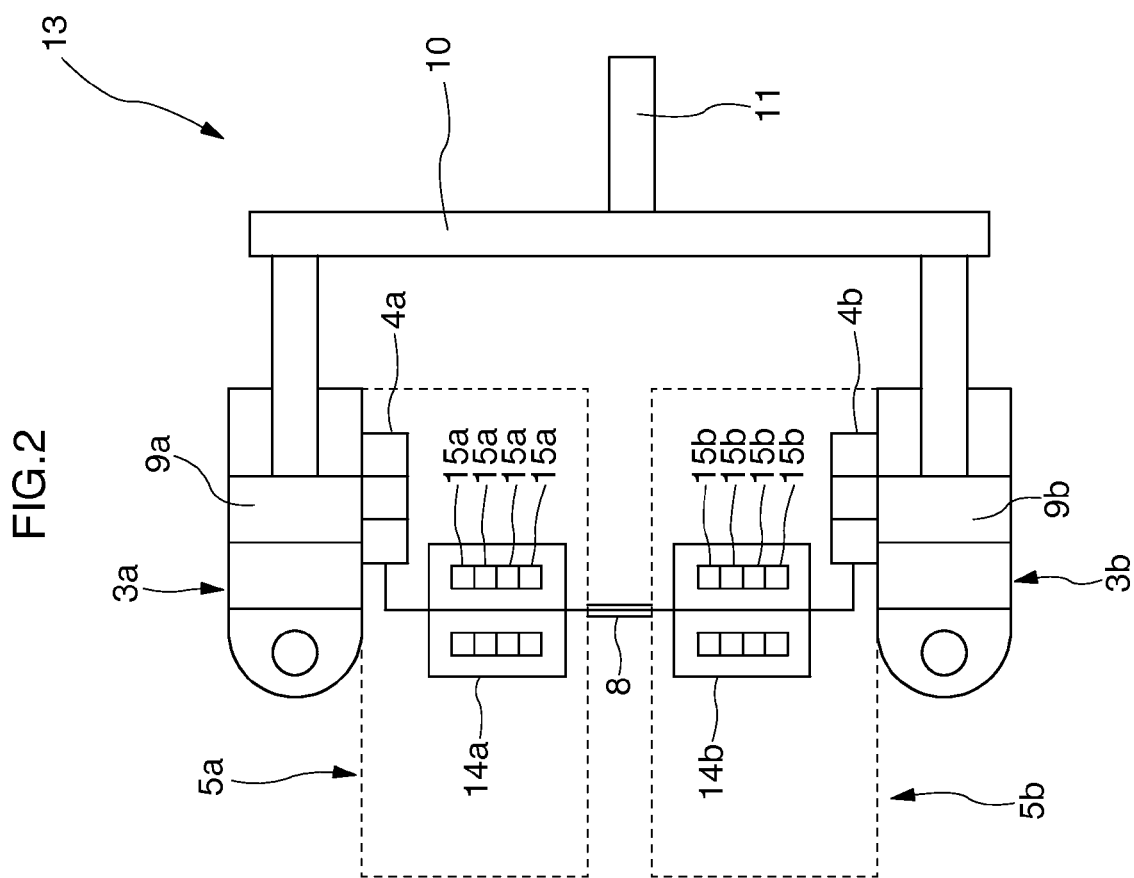

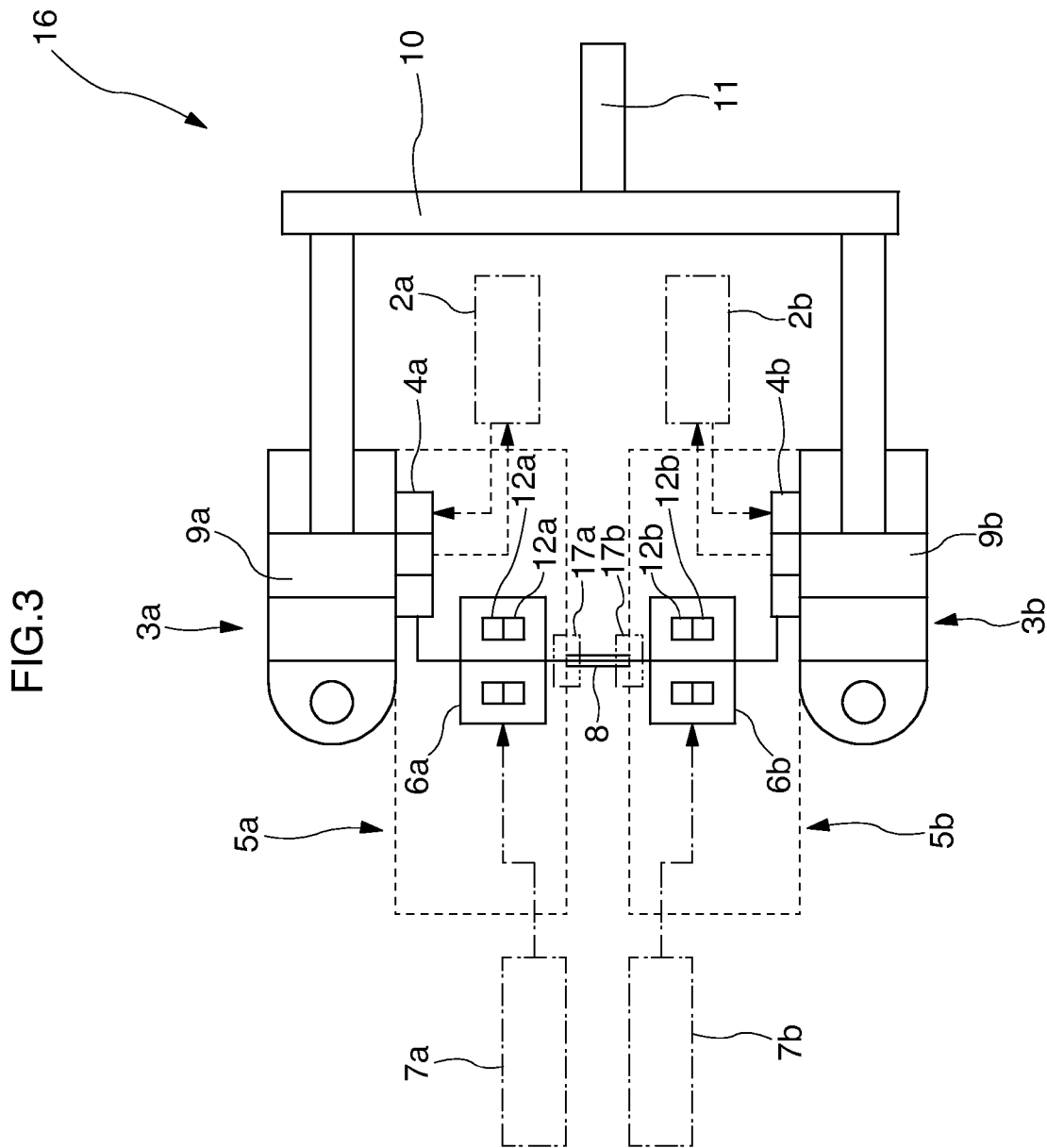

HYDRAULIC CYLINDER SYSTEM

CROSS REFERENCE TO RELATED APPLICATIONS

This application is a National Stage of International Application No. PCT/JP2011/075904 filed Nov. 10, 2011, claiming priority based on Japanese Patent Application No. 2010-261915 filed Nov. 25, 2010, the contents of all of which are incorporated herein by reference in their entirety.

TECHNICAL FIELD

The present invention relates to a hydraulic cylinder system used for a maneuvering system of an aircraft and the like, having a plurality of cylinders, a valve provided at each cylinder for supplying operating fluid to the cylinders, and a driving system having a motor provided at each valve for driving the valve.

BACKGROUND ART

In a hydraulic cylinder system used in a maneuvering system of an aircraft, a vehicle and the like, a configuration provided with electric redundancy has been employed (See Patent Literature 1, for example). And, in the hydraulic cylinder system having the prior-art configuration, a large number of coils need to be provided in a motor of a driving system in order to realize high electric redundancy. With this, the size of the motor of the driving system increases, and thus creates a problem that the size and the mass of the hydraulic cylinder system itself increase.

CITATION LIST

Patent Literature

Patent Literature 1: Japanese Unexamined Patent Application Publication No. 53-76276

SUMMARY OF INVENTION

Technical Problem

The present invention has paid attention to the above-described points and has an object to realize high redundancy while preventing increases of the size and the mass of the hydraulic cylinder.

Solution to Problems

That is, the hydraulic cylinder system according to the present invention is characterized by including a plurality of cylinders, a valve provided at each cylinder for adjusting amount of operating fluid into and out of the cylinder, a driving system having a motor provided at each valve for driving the valve, and a connecting member connecting the motors of the driving system in a manner capable of interlocking with each other.

With such configuration, since the motors of the driving systems are connected by the connecting member in the manner capable of interlocking with each other, in a system having two driving systems, for example, if a motor having double redundancy is provided in each driving system, the configuration having quadruple redundancy as the entire system can be realized. That is, since the configuration having quadruple redundancy can be realized by a motor provided with only two coils, the size of the motor can be made smaller than the prior-art one. Moreover, in the system having two driving systems, if a motor having quadruple redundancy is provided in each driving system, since the motors of the driving systems are connected by the connecting member in the manner capable of interlocking with each other, the output of the motor can be made half of the prior-art one. That is, even with such configuration, the size of the motor can be made smaller than the prior-art one.

As an example of the configuration as above for obtaining an effect of reducing the size of the motor by lowering redundancy of the motor of each driving system, such configuration can be cited in which the pistons of the plurality of cylinders are connected to each other in a manner capable of integral operation, and each motor of the plurality of driving systems are connected to the valves so that the valve of each driving system is driven by each motor and supplies the operating fluid to the cylinder to drive the piston of this cylinder, thereby driving the driving target connected to piston connection portion. Also, such configuration can be cited in which by operating the motor of only one of the plurality of driving systems, the operating fluid is supplied from the valve driven by the motor of this driving system to the cylinder so that the driving target connected to the piston connection portion is driven by driving the piston of this cylinder.

On the other hand, as an example of the configuration for obtaining the effect of size reduction by using those with a low output for the motor of each driving system as described above, a hydraulic cylinder system can be cited in which the pistons of the plurality of cylinders are connected to each other in a manner capable of integral operation, each motor of the plurality of driving systems is driven so as to supply the operating fluid to each cylinder from each valve driven by the motor of each driving system and to drive the piston of each cylinder, thereby driving the driving target connected to the piston connection portion.

Moreover, a disconnecting mechanism for disconnecting transmission of power between the connecting member and each motor is provided between the connecting member and each motor so as to disconnect the transmission of power between the connecting member and a motor in which a failure is detected by operating this disconnecting mechanism when a failure of the motor is detected. Therefore, even if malfunction occurs in one driving system, the other driving system where there is no malfunction is not affected by the operation failure, and the operation of the hydraulic cylinder on the driving system side can be continued.

Advantageous Effects of Invention

According to the configuration of the hydraulic cylinder system of the present invention, high redundancy can be realized while increases of the size and the mass of the hydraulic cylinder are prevented.

Moreover, in a system configured such that the disconnecting mechanism for disconnecting transmission of power between the connecting member and the motor is operated if a failure of the motor is detected, even if malfunction occurs in one driving system, the other driving system where there is no malfunction is not affected by the operation failure, and thus the operation of the hydraulic cylinder on the driving system side can be continued, and vulnerability to the operation failure of the driving system can be improved.

BRIEF DESCRIPTION OF DRAWINGS

FIG. 2 is a diagram schematically illustrating a hydraulic cylinder system according to a second embodiment of the present invention.

FIG. 3 is a diagram schematically illustrating a hydraulic cylinder system according to a third embodiment of the present invention.

DESCRIPTION OF EMBODIMENTS

Figure 1:
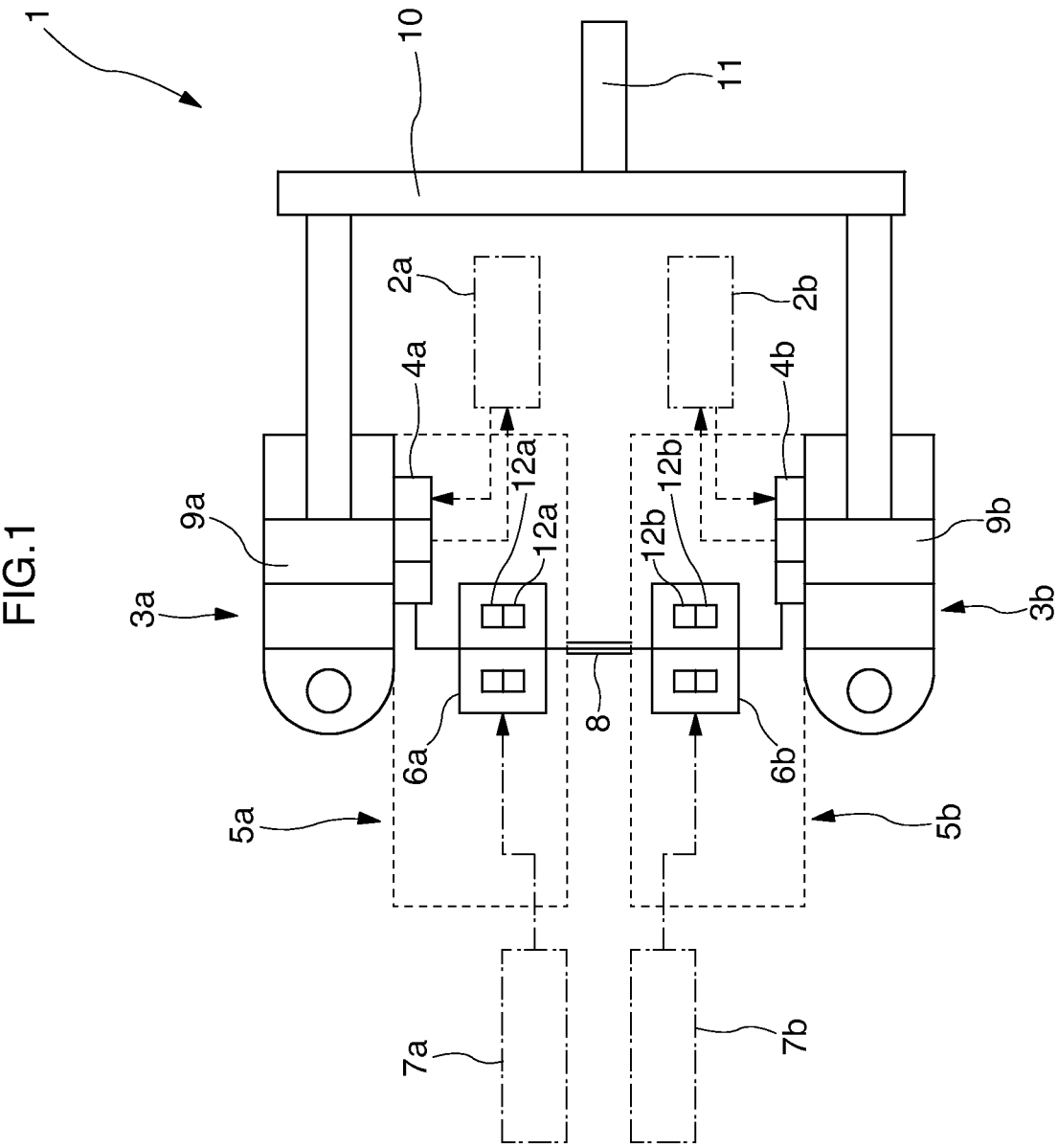
FIG. 1 is a diagram schematically illustrating a hydraulic cylinder system according to a first embodiment of the present invention.

A first embodiment of the present invention will be described below by referring to FIG. 1.

A hydraulic cylinder system 1 according to this embodiment is mainly used for a maneuvering system of an aircraft such as a helicopter and the like, and comprises first and second cylinders 3a and 3b receiving supply of operating fluid from first and second operating fluid supply sources 2a and 2b, respectively; first and second valves 4a and 4b provided at the first and second cylinders 3a and 3b, respectively, for adjusting amounts of the operating fluid from the supply sources 2a and 2b into and out of these cylinders 3a and 3b; first and second motors 6a and 6b provided at the first and second valves 4a and 4b, respectively, for driving these valves 4a and 4b and first and second driving systems 5a and 5b having the motors 6a and 6b, respectively; first and second controllers 7a and 7b for controlling the first and second driving systems 5a and 5b, respectively; a connecting member 8 for connecting the motors 6a and 6b of the first and second driving systems 5a and 5b in a manner capable of interlocking with each other, a piston connection portion 10 for connecting pistons 9a and 9b of the first and second cylinders 3a and 3b to each other in a manner capable of integral operation; and an output shaft 11 configured to be connected to this piston connection portion 10. The output shaft 11 is connected to a driving target of this hydraulic cylinder system 1.

The first and second cylinders 3a and 3b have the same shape, and those having been known to be used in this type of hydraulic cylinder systems can be used.

The first and second valves 4a and 4b are connected to passages for having the operating fluid flowing into and out of a cylinder chamber of each of the first and second cylinders 3a and 3b, and opening degrees thereof are continuously variable. More specifically, though not shown, the first and second valves 4a and 4b are servo valves configured to move a valve element inside by power from the first and second driving systems 5a and 5b or more specifically from the motors 6a and 6b.

The motors 6a and 6b of the first and second driving systems 5a and 5b are servo motors connected to the first and second valves 4a and 4b, respectively, and drive the valves 4a and 4b upon receipt of signals from the controllers 7a and 7b. Moreover, in this embodiment, these motors 6a and 6b have two sets of coils 12a and 12b each. That is, each of the motors 6a and 6b has double electric redundancy.

The controllers 7a and 7b are, though not shown, microcomputer systems each having a CPU, memory, an input/output interface and the like and has a configuration similar to those known as being widely used in this type of hydraulic cylinder systems.

As described above, in this embodiment, the output shaft of the motor 6a of the first driving system 5a and the output shaft of the motor 6b of the second driving system 5b are connected by the connecting member 8 in the manner capable of interlocking with each other. Then, the output shafts of the motors 6a and 6b of the first and second driving systems 5a and 5b are interlocked with each other and the valves 4a and 4b are driven so that the entirety is made to function as a driving system having quadruple electric redundancy. Moreover, electricity is supplied only to one of the motors 6a and 6b of the first and second driving systems 5a and 5b, and the output shafts of the motors 6a and 6b of the first and second driving systems 5a and 5b are interlocked with each other to drive the valves 4a and 4b so that the entirety is made to function as a driving system having quadruple redundancy.

That is, when a driving target connected to the output shaft 11 is to be driven by using this hydraulic cylinder system 1, the controller executes control as follows.

First, the coils 12a and 12b of each of the motors 6a and 6b of the first and second driving systems 5a and 5b are supplied with electricity by the controllers 7a and 7b. An output of the motor 6a by two coils of the coils 12a is transmitted to the motor 6b through the connecting member 8, and the valve 4b of the driving system 5b is driven by the driving forces of the motor 6a and the motor 6b. To the contrary, regarding the valve 4a of the driving system 5a, an output of the motor 6b by two coils of the coils 12b is transmitted to the motor 6a through the connecting member 8 and the valve 4 is driven by the driving forces of the motor 6b and the motor 6a. When a failure in an electric system is detected by the controllers 7a and 7b, the controllers 7a and 7b shut off electricity in the coil in which the failure in the electric system of the coils 12a and 12b is detected, and the driving of the valves 4a and 4b of the driving systems 5a and 5b is continued by the normal coils 12a and 12b. Alternatively, first, the motor to be supplied with electricity is selected in the motors 6a and 6b of the first and second driving systems 5a and 5b. Then, if the motor 6a of the first driving system 5a is selected, which one of the coils 12a provided in this motor 6a is to be supplied with electricity is selected. If the motor 6b of the second driving system 5b is selected, which one of the coils 12b provided in this motor 6b is to be supplied with electricity is selected. After that, if it is detected that a predetermined conducted coil switching condition is met such as when the temperature of the coils 12a and 12b having been supplied with electricity has reached a predetermined threshold value or more and the like, electricity to the motors 6a and 6b including the coils 12a and 12b is shut off, and electricity is supplied to the other motors 6a and 6b. Here, as a detection element for detecting that the predetermined conducted coil switching condition is met, a temperature sensor for detecting a temperature of the coil connected to the controller and the like is used, for example. Determination of detection that the predetermined conducted coil switching condition is met is made on the basis of a signal outputted to the controllers 7a and 7b from the detection element.

As described above, according to the hydraulic cylinder system 1 according to this embodiment, while the motors 6a and 6b each having double redundancy are provided in the first and second driving systems 5a and 5b, respectively, the output shafts of the motors 6a and 6b are connected by the connecting member 8 and they are interlocked with each other and thus, the entirety is made to function as a driving system having quadruple redundancy. Therefore, a desired output can be obtained without increasing the sizes of the motors 6a and 6b and thus, without increasing the size or mass of the entire hydraulic cylinder system 1 and the hydraulic cylinder system 1 provided with high electric redundancy can be realized.

Subsequently, a second embodiment of the present invention will be described by referring to FIG. 2. Since the hydraulic cylinder system 13 of this second embodiment has the same configuration as that in the first embodiment except the motors of the first and second driving systems, the same terms and reference numerals are given and detailed explanation will be omitted. In FIG. 2, the supply sources 2*a* and 2*b* of the operating fluid and the controllers 7*a* and 7*b* are omitted in the illustration.

Motors 14*a* and 14*b* of the first and second driving systems 5*a* and 5*b* of this embodiment have four sets of coils 15*a* and 15*b* each. That is, each of the motors 14*a* and 14*b* has quadruple electric redundancy. Moreover, in this embodiment, an output of each of the motors 14*a* and 14*b* is set to a half of that according to the first embodiment. Also, in this embodiment, the motors 14*a* and 14*b* of the first and second driving systems 5*a* and 5*b* are supplied with electricity at the same time, and the first and second cylinders 3*a* and 3*b* are driven at the same time.

Therefore, in this embodiment, the output shaft of the motor 14*a* of the first driving system 5*a* and the output shaft of the motor 14*b* of the second driving system 5*b* are connected by the connecting member 8 in the manner capable of interlocking as described above. Then, by supplying electricity to the motors 14*a* and 14*b* of the first and second driving systems 5*a* and 5*b* at the same time and by interlocking the output shafts of the motors 14*a* and 14*b* of the first and second driving systems 5*a* and 5*b* in a state connected by the connecting member 8 in the manner capable of interlocking and by driving the valves 4*a* and 4*b*, the entirety is made to function as the driving system having quadruple electric redundancy.

Here, in order to drive the driving target connected to the output shaft 11 using a hydraulic cylinder system 13, the controllers 7*a* and 7*b* execute known control as control for the driving system having electric redundancy quadruple of a usual one for each of the driving systems 5*a* and 5*b*. Upon receipt of this control, a driving force is outputted to the first and second valves 4*a* and 4*b* from the outputs shafts of the motors 14*a* and 14*b* of the first and second driving systems 5*a* and 5*b*. At this time, since the outputs of the motors 14*a* and 14*b* of the first and second driving systems 5*a* and 5*b* are halves of the outputs of the motors 6*a* and 6*b* according to the first embodiment as described above, the driving force outputted to the first and second valves 4*a* and 4*b* becomes the same as that according to the first embodiment as a result.

As described above, according to the hydraulic cylinder system 13 according to this embodiment, by providing the motors 14*a* and 14*b* each capable of outputting a half of a desired output while providing quadruple redundancy in each of the driving systems 5*a* and 5*b*, and by connecting the output shafts of the motors 14*a* and 14*b* to each other by the connecting member 8 and interlocking them, a desired output as the whole can be obtained, and the system functions as a driving system having quadruple electric redundancy. Therefore, with such configuration, too, the desired output can be obtained without increasing the size of the motor and thus, without increasing the size or mass of the entire hydraulic cylinder system, and a hydraulic cylinder system provided with high electric redundancy can be realized.

Subsequently, a third embodiment of the present invention will be described by referring to FIG. 3. A hydraulic cylinder system 16 of this third embodiment is different from the hydraulic cylinder system 1 in the first embodiment in the following points and has the same configuration as the hydraulic cylinder system 1 of the first embodiment in the other points. In the following explanation, portions corresponding to those in the hydraulic cylinder system 1 in the first embodiment are given the same terms and reference numerals.

In this embodiment, disconnecting mechanisms 17*a* and 17*b* for disconnecting transmission of power between the connecting member 8 and the motors 6*a* and 6*b*, respectively, are provided between the connecting member 8 connecting the motors 6*a* and 6*b* of the first and second driving systems 5*a* and 5*b* in the manner capable of interlocking with each other and the motors 6*a* and 6*b*. These disconnecting mechanisms 17*a* and 17*b* are configured by using a clutch mechanism using a spring in this embodiment. However, in order to disconnect the connecting member 8 and the motors 6*a* and 6*b* and to interlock the motors 6*a* and 6*b* with each other, employment of a configuration in which they are connected in the manner capable of interlocking with each other through a clutch member is not precluded.

In this embodiment, if a failure such as malfunction or the like occurs in the motor 6*a* of the first driving system 5*a*, the controller 7*a* operates the disconnecting mechanism 17*a* and shuts off transmission of power between the connecting member 8 and the motor 6*a*. At this time, the motor 6*b* of the second driving system 5*b* is not affected by the malfunction of the motor 6*a* of the first driving system 5*a* but continues operation, so that the second valve 4*b* continuously operates and thus, the second cylinder 3*b* also operates continuously.

On the contrary, if a failure such as malfunction or the like occurs in the motor 6*b* of the second driving system 5*b*, the controller 7*b* operates the disconnecting mechanism 17*b* and shuts off transmission of power between the connecting member 8 and the motor 6*b*. At this time, the motor 6*a* of the first driving system 5*a* is not affected by the malfunction of the motor 6*b* of the second driving system 5*b* but continues operation, so that the first valve 4*a* continuously operates and thus, the first cylinder 3*a* also operates continuously.

Here, as a detecting element for detecting a failure such as malfunction or the like of the motor 6*a* or 6*b*, a temperature sensor for detecting a temperature of the coil connected to the controller or the like is used, for example. Then, determination that a failure such as malfunction or the like of the motor 6*a* or 6*b* is detected is made on the basis of a signal outputted from the detecting element to the controller 7*a* or 7*b*.

According to the configuration of this embodiment, in addition to the effects according to the configuration of the first embodiment, the following effects can be obtained. That is, since the disconnecting mechanisms 17*a* and 17*b* for disconnecting transmission of power between the connecting member 8 and the motors 6*a* and 6*b* are provided between the connecting member 8 connecting the motors 6*a* and 6*b* of the first and second driving systems 5*a* and 5*b* in the manner capable of interlocking with each other and the motors 6*a* and 6*b*, respectively, and since the disconnecting mechanisms 17*a* and 17*b* are configured to operate when a failure such as malfunction of the motor 6*a* or 6*b* or the like is detected, even if malfunction occurs in one of the driving systems, the other driving system side where there is no malfunction is not affected by the malfunction, and thus the operation of the hydraulic cylinder on the driving system side can be continued.

The present invention is not limited to the above-described embodiments.

For example, in the above-described first embodiment, two motors each having double electric redundancy are connected by the connecting member, but two motors each having single or triple or more electric redundancy may be connected by the connecting member or three or more motors may be connected by the connecting member. The two controllers control the motors but one or three or more controllers may perform control.

Moreover, in the above-described second embodiment, two motors each having quadruple electric redundancy are connected by the connecting member, but two motors each having double, triple or quintuple or more electric redundancy may be connected by the connecting member or three or more motors may be connected by the connecting member, and electricity may be supplied simultaneously to these three or more motors. The motors are controlled by two controllers, but the number of controllers may be one or three or more.

Moreover, in the above-described third embodiment, the mode in which the disconnecting mechanism is operated by the controllers 7a and 7b is illustrated, but it may be so configured that disconnection is achieved by rupture or slippery of the connecting member 8 caused by a certain load without through the controllers 7a and 7b.

Various other variations may be made within a scope not departing from the gist of the present invention.

INDUSTRIAL APPLICABILITY

If the configuration of the hydraulic cylinder system of the present invention is employed, by connecting the motors of the driving systems by the connecting member in the manner capable of interlocking with each other, high electric redundancy can be realized while increases of size and mass of the hydraulic cylinder are prevented.

Moreover, when the disconnecting mechanism for disconnecting transmission of power between the connecting member and the motor is operated when a failure in the motor for driving the valve is detected, even if malfunction occurs in one of the driving systems, the other driving system where there is no malfunction is not affected by the malfunction, and thus the operation of the hydraulic cylinder on the driving system side can be continued, and vulnerability to malfunction of the driving system can be improved.

REFERENCE SIGNS LIST 1, 13, 16 hydraulic cylinder system
3a, 3b cylinder
4a, 4b valve
5a, 5b driving system
6a, 6b, 14a, 14b motor
8 connecting member

The invention claimed is:

1. A hydraulic cylinder system comprising:
a plurality of cylinders;
a valve provided at each cylinder for adjusting amount of operating fluid into and out of the cylinder;
a driving system having a motor provided at each valve and driving the valve; and
a connecting member connecting the motors of the driving system in a manner capable of interlocking with each other,
wherein output shafts of the motors of the driving system are connected in the manner capable of interlocking with each other whereby each of the valves can be driven by driving forces of each of the other motors, which drive other valves;
wherein each of the motors of the driving system that are connected in the manner capable of interlocking with each other have double or more electric redundancy.

2. The hydraulic cylinder system according to claim 1, wherein
pistons of the plurality of cylinders are connected to each other in a manner capable of integral operation;
only the motor of any one of the plurality of driving systems is operated;
operating fluid is supplied from the valve driven by the motor of this driving system to the cylinder; and
the piston of the cylinder is driven so as to drive a driving target connected to a piston connection portion.

3. The hydraulic cylinder system according to claim 1, wherein
pistons of the plurality of cylinders are connected to each other in a manner capable of integral operation;
each of the motors of the plurality of driving systems is operated;
operating fluid is supplied from each valve driven by the motor of each driving system to each cylinder; and
the piston of each cylinder is driven so as to drive a driving target connected to a piston connection portion.

4. The hydraulic cylinder system according to claim 1, wherein
a disconnecting mechanism for disconnecting each of transmission of power between the connecting member and each motor is provided between the connecting member and each of the motors; and
if a failure of the motor is detected, this disconnecting mechanism is operated so as to disconnect the transmission of power between the connecting member and the motor in which the failure is detected.

5. The hydraulic cylinder system according to claim 2, wherein
a disconnecting mechanism for disconnecting each of transmission of power between the connecting member and each motor is provided between the connecting member and each of the motors; and
if a failure of the motor is detected, this disconnecting mechanism is operated so as to disconnect the transmission of power between the connecting member and the motor in which the failure is detected.

* * * * *